United States Patent Office 3,054,898
Patented Sept. 18, 1962

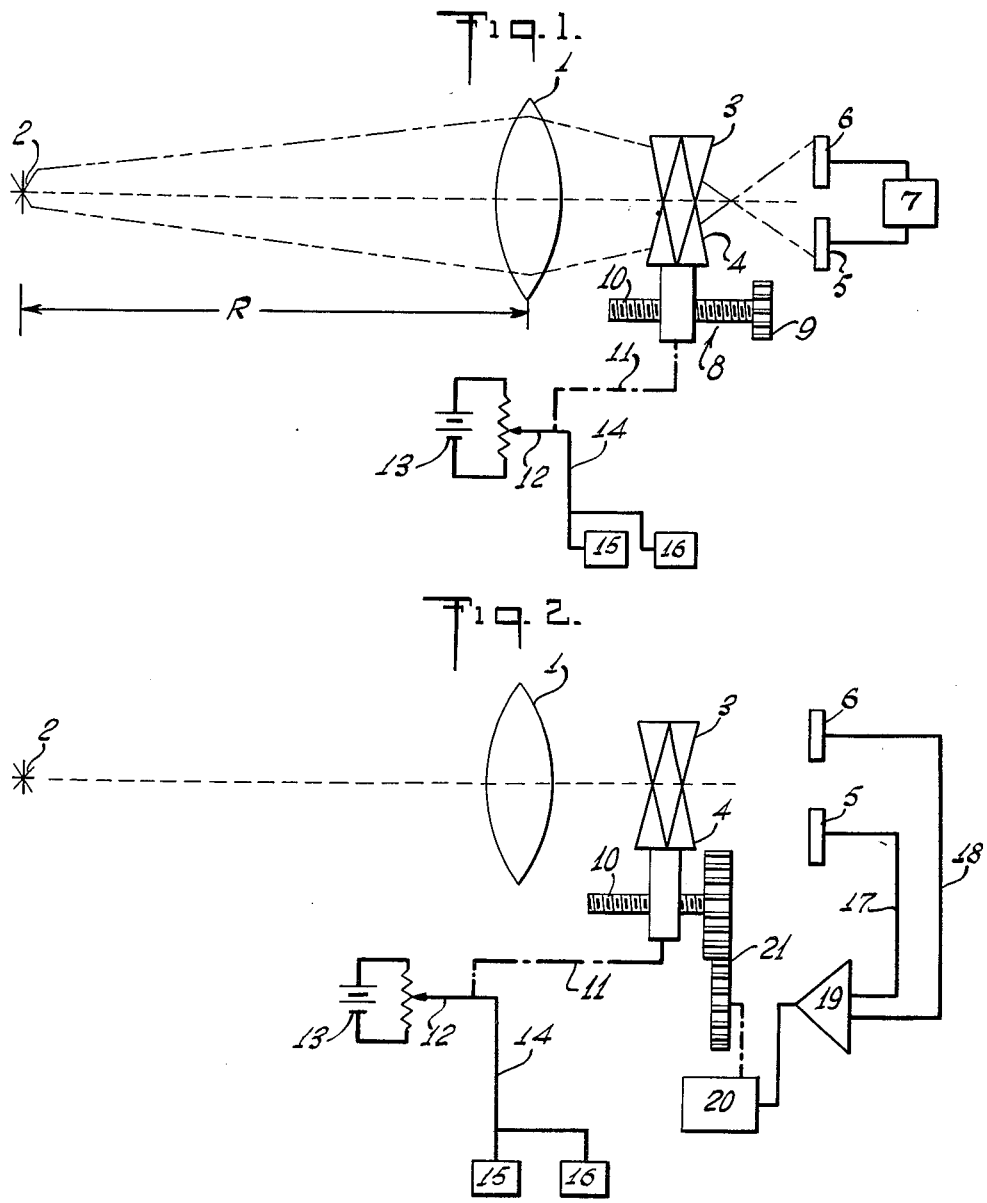

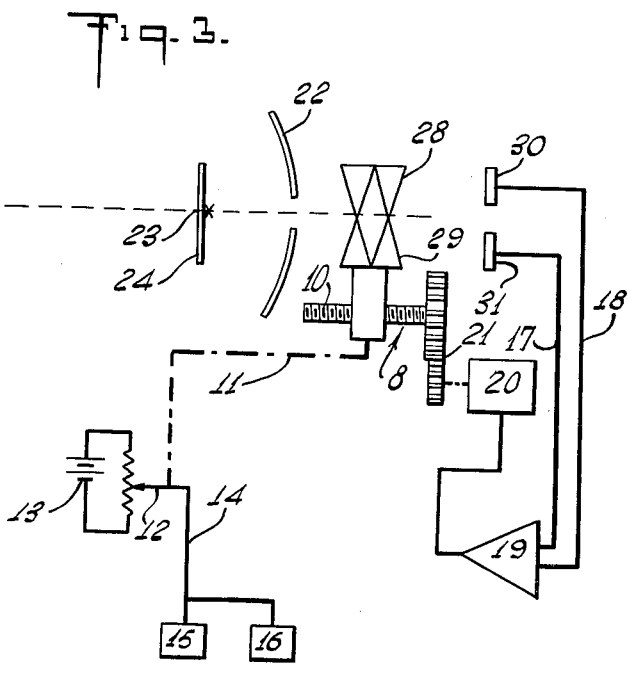
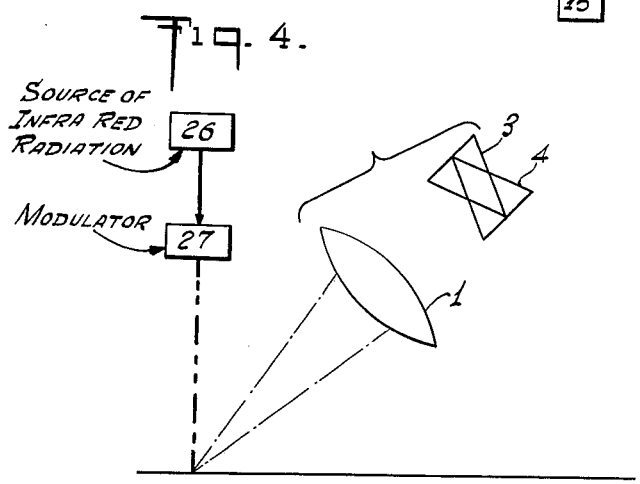

3,054,898
INFRARED RANGING SYSTEM
Thomas A. Westover, Hempstead, and Bernard Rosett, Forest Hills, N.Y., assignors to Servo Corporation of America, Hicksville, N.Y., a corporation of New York
Filed Mar. 14, 1960, Ser. No. 14,930
15 Claims. (Cl. 250—83.3)

This invention relates to an infrared range determining system. More particularly, it relates to optical apparatus for detecting thermal radiation and for determining the range from an infrared radiator to the optical apparatus.

Ranging systems, known in the art, are primarily of the radio communication or radar type in which a radio signal is transmitted from one station to a target station which reflects the signal back to receiving apparatus at the first station. The time of travel of the signal is measured and from this information the distance to the target may be ascertained.

While such systems generally operate very satisfactorily, they are subject to limitations under certain conditions. For example, the radio signals are more easily detected by unauthorized persons, thus revealing the presence of the transmitting station. They are also subject to interference by natural or artificial sources of electromagnetic disturbances, such as static and jamming. Furthermore, the signals, in traveling along different paths, quite often fade or provide ghost signals thereby preventing a true indication of the range from being made.

The system of the present invention alleviates these limitations by using radiation in the infrared range of the frequency spectrum, in either an active or a passive manner, to determine the range from an observation station to a target station. Moreover, the system of this invention is adaptable for use where either or both stations are airborne or ground stations and where either or both are stationary or moving with respect to each other. In addition, the system may provide a single indication of the range or it may operate in a continuous manner to track a target or object under observation.

According to the present invention, optical means are provided for converging the rays of the infrared radiation emitted by a target. The converging infrared rays are thereafter deviated and formed into split images by optical deviating elements; the coincidence of the split images being determined at infrared detecting devices which are connected to provide an equilibrium condition. By displacement of the optical deviating elements from a normal position, a coincidence or equilibrium condition can be effected at the detectors. This movement or displacement of the deviating elements is a function of the range of the optical system to the target.

The above-mentioned and other features and objects of this invention and the manner of attaining them will become more apparent and the invention itself will be best understood by reference to the following description of an embodiment of the invention taken in conjunction with the accompanying drawings, wherein:

FIGURE 1 is a side view of one embodiment of the invention;

FIGURE 2 is a side view of a modified version of the embodiment of FIGURE 1;

FIGURE 3 is a side view of a second embodiment of the invention;

FIGURE 4 is a side view of an active-type system which incorporates the version of the detecting system of FIGURE 2.

With reference to FIGURE 1 of the drawing, a convex lens 1, which is fixedly positioned in a housing that is not shown, is spaced a substantial distance R from a source of infrared radiation 2, so that a portion of the rays from the source may strike the lens and be converged by it. Triangular prisms 3 and 4 are located in the path of the rays converged by the lens 1. The prisms are positioned in side-by-side relation along the principal axis of the lens; the prism 3 being inverted with respect to the prism 4. While positioned in inverted, side-by-side relation, the apex of each prism is aligned with the base of the other prism. The base-apex lines of the prisms are spaced equal distances above and below the principal axis of the lens to provide a neutral or normal condition corresponding to a known range of the source 2 to the lens 1; the purpose of establishing a neutral or normal position becoming more apparent hereinafter. In addition, the prisms are of the same geometrical shape and have the same index of refraction. Therefore, the only variable that can control the amount of lateral separation of the split images is the axial position of the prism pair moved longitudinally as a unit.

An individual detector is associated with each prism; detector 5 being related to prism 3 while detector 6 is related to prism 4. The detectors, which are maintained a constant distance from lens 1, are of the opto-electrical transducer type which are responsive to infrared radiation to produce an electrical signal indicative of the magnitude of radiation striking the detectors. As an illustration of the types of detectors that may be utilized, thallous sulfide cells have been used, particularly for night reception since they are considered to be more responsive than other types, whereas lead sulfide cells, silicon cells and vacuum phototubes are preferred for daytime operation, since they provide a more linear response to the radiation. Moreover, it is known that when the heat or exhaust from a body is being detected, lead sulfide cells are preferred.

The rays of infrared radiation, which are converged by lens 1, strike the prisms 3 and 4, causing split images which may be diviated from a coincident or normal condition in a lateral manner, i.e., the images may be displaced in up and down directions dependent on the range of the source of radiation 2 to the converging lens 1. This deviation of the images from a coincident condition is determined by the amount of refraction caused by the prisms and by their longitudinal location on the axis. As previously mentioned, the angles of the prisms and their indices of refraction are the same. Therefore, by changing the axial position of the prism pair, an equilibrium or coincident condition of the emerging split images can be achieved. The amount of longitudinal movement or displacement of the prisms from their normal or neutral position then constitutes a function of the range between source 2 and lens 1.

The detectors 5 and 6, which have been previously described, are provided to sample the infrared energy which has been formed into two split images to indicate whether an equilibrium condition has been attained. Each of the detectors produces an electrical signal in response to the radiation that it detects. The signals are fed to an equilibrium indicator, such as that depicted by the reference numeral 7 in FIGURE 1. This indicating unit may take the form of a galvanometer which shows on its face when an equilibrium condition occurs or it may be an audible indicator which produces an audible signal until the equilibrium condition is attained.

In order to displace the prism unit, from its normal or neutral position and thus to obtain an equilibrium condition at the detecting devices, mechanical drive means, generally indicated at 8, are provided. The drive means is comprised of a threaded screw 10 that may be reversibly rotated by a manually adjustable knob 9. Movement of the knob 9 will rotate the screw 10 which will drive the prisms 3 and 4 either toward each other or away from each other.

Since the excursion of the threaded screw 10 is related to the displacement of the prisms 3 and 4 from a neutral position, it is also a function of the range R between the source 2 and lens 1. Therefore, a mechanical connection 11 is provided from the threaded screw 10 to a wiper arm 12 of potentiometer 13. An electrical connection 14 is provided from the arm 12 so that the potentiometer output will reflect the displacement of the threaded screw 10 and thus of the prisms 3 and 4 directly in terms of the range R, or, in terms of voltage or current. This information may be read directly, at indicator 15 or it may be fed to a utilization unit which has been depicted by the reference numeral 16. This unit may take the form of an aircraft control system such as an autopilot or it may be a weapons control system.

In FIGURE 2, automatic adjusting means for the prism unit, to obtain an equilibrium condition in the quantity of infrared energy striking detectors 5 and 6, replaces the manual control of the embodiment of FIGURE 1. In this version of the invention, the detectors 5 and 6, each produce an electrical signal in response to the infrared images detected by them. The signals which are proportional to the amount of radiation that is detected are fed through conductors 17 and 18 to an amplifier 19. The output of the amplifier is fed to a reversible motor 20 which produces a mechanical output to drive the threaded screw 10 through a gearing arrangement 21. In this manner, the prisms may be adjusted in a continuous manner as a function of the radiation being detected by detectors 5 and 6. The amount of prism displacement, which is a function of the range R, is again measured with a potentiometer arrangement as in FIGURE 1. The output information may be correlated directly in terms of range or it may be in the form of an electrical control signal.

By utilizing a closed loop feedback arrangement, the ranging system can provide continuous tracking of a target. The target may be stationary or moving with respect to the tracking station. Furthermore, it may be an airborne or ground target.

Referring to FIGURE 3 of the drawings, the infrared rays are converged by using a reflecting mirror system. A concave mirror 22 reflects a portion of the infrared rays emanating from target source 2 and directs them toward its focal point 23. A plane surface mirror 24 is positioned between the concave mirror and the focal point to redirect the rays through an aperture 25 centrally located in the concave mirror 22. The converged rays then strike the prisms 28 and 29 which refract the rays resulting in split images which are detected at the detectors 30 and 31, which produce electrical signals indicative of the quantity of radiation being detected. The remainder of the system operates in the same manner as the converging lens arrangement depicted in FIGURE 2, that is, the images are brought to an equilibrium condition at the detectors by displacing the prisms along the optical axis from a neutral position by means of the mechanical drive 8 which operates in closed loop manner under the control of signals from detectors 30 and 31. Range measurements are made from potentiometer output connector 14 as in the convergent lens embodiment of FIGURE 1.

Heretofore, two embodiments of the invention have been described as operating in a passive manner. The system has detected infrared rays emanated by a target under observation or from an object dissipating heat. It is to be understood that the invention is not to be so limited, but is to extend to an active-type system in which a source of infrared radiation may be projected from the ranging system. An active-type system may be necessary where it is required to measure the range, such as the altitude of an air vehicle, when traveling over a uniform or homogeneous terrain.

Referring to FIGURE 4, a source of infrared radiation 26, such as an incandescent tungsten filament lamp, may be used to project a target on the terrain. The detecting system of FIGURE 2 would then detect the reflected rays from the terrain so that the range could be determined. It may be necessary to filter the radiation from the source since, as in the case of a tungsten lamp, visible light may also be emitted by it. Furthermore, it might be necessary to modulate the projected beam to assure that the ranging system will detect the modulated radiation only, thus maintaining the secretiveness of the operation. These two elements are shown in block form by the reference numeral 27. The beam projector could form an integral part of the detecting system or it could be separate and distinct from it and be boresighted with respect to it.

It is realized that many modifications and variations could be made in carrying out this invention without departing from the spirit or scope thereof and, therefore, it is intended that the drawings and description be interpreted in an illustrative rather than a limitive sense.

What is claimed is:

1. An infrared ranging system comprising means for converging rays from a source of infrared radiation to form an infrared image, means positioned in the path of the converging rays for splitting the converging rays into two images, detecting means associated with each of said formed images for detecting the infrared radiation impinging on each, movable means acting on said ray splitting means for bringing the formed images into an equilibrium condition as determined by said detecting means and means responsive to the amount of movement of the movable means to indicate the range of the source of infrared radiation to said converging means.

2. An infrared ranging system as claimed in claim 1, wherein said means which are positioned in the path of the converging rays for splitting the converging rays into two images are comprised of two triangular optical prisms.

3. An infrared ranging system as claimed in claim 2, wherein the first of said prisms is positioned equidistantly above and below the principal axis of said means for converging the infrared rays and wherein, the second of said prisms is inverted with respect to the first of said prisms and positioned equidistantly above and below the principal axis of said means for converging the infrared rays.

4. An infrared ranging system as claimed in claim 3, wherein said prisms are mounted in side-by-side relationship, such that the transverse axis of the apex of each prism coincides with the transverse axis of the base of the other prism, so as to define a neutral or normal position, the amount of displacement from the neutral position to obtain an equilibrium condition constituting a function of the range to the source.

5. An infrared ranging system as claimed in claim 1, wherein the movable means which act on said ray splitting means to bring the formed images to an equilibrium condition is comprised of a reversible threaded screw which will actuate said ray splitting means to displace them, and a rotatable manually operated control which, when rotated, actuates said threaded screw to displace said ray splitting means.

6. An infrared ranging system as claimed in claim 1, wherein said detectors produce electrical signals indicative of the quantity of energy impinging on them which signals control the movement of said movable means and the displacement of said ray splitting means while attaining an equilibrium condition, and wherein, said movable means which act on said ray splitting means to bring the formed images to an equilibrium condition is comprised of a reversible motor responsive to said electrical output, and a threaded screw which will actuate said ray splitting means to displace them in response to the mechanical output from said reversible motor.

7. An infrared ranging system as claimed in claim 1, wherein said means responsive to the amount of movement of the movable means is comprised of a potentiometer, a wiper arm adapted to brush said potentiometer and a mechanical drive actuated by the movement of said movable means to drive said potentiometer wiper arm whereby said potentiometer is brushed and an indication of the range from the source is provided.

8. An infrared ranging system as claimed in claim 1, wherein said means for converging the rays from the source of infrared radiation to form an infrared image constitutes an converging lens system.

9. An infraed ranging system as claimed in claim 1, wherein said means for converging the rays from the source of infrared radiation to form an infrared image constitutes an arrangement of reflecting mirrors.

10. An infrared ranging system as claimed in claim 9, wherein said arrangement of reflecting mirrors is comprised of a concave mirror having an aperture centrally located therein and disposed in the path of a portion of the infrared radiation, and a plane surface mirror positioned between the concave mirror and the focal point of said concave mirror for redirecting said reflected rays through said aperture.

11. An infrared ranging system, having in combination, a source of infrared radiation adapted to project a target beam of radiation which may be reflected by a uniform surface, means for converging the rays of radiation reflected by the uniform surface to form an infrared image, said means for converging the rays of radiation being disposed substantially at the same location as said source, means positioned in the path of the converging rays for splitting the converging rays into two images, detecting means associated with each of said formed images for detecting the infrared radiation impinging on each, movable means acting on said ray splitting means for bringing the formed images into an equilibrium condition as determined by said detecting means and means responsive to the amount of movement of the movable means to indicate the range of the reflecting surface to said converging means.

12. A system as claimed in claim 11, wherein said source of infrared radiation is integrally formed with the detecting apparatus of said infrared ranging system.

13. A system as claimed in claim 11, wherein said source of infrared radiation is separate and distinct from the detecting apparatus of said infrared ranging system but is boresighted with respect to it.

14. A system as claimed in claim 11, including modulating means whereby the target beam of radiation from said source of infrared radiation is modulated so as to render only the detecting apparatus of said infrared ranging system responsive to it.

15. A system as claimed in claim 11, including filter means whereby the target beam of radiation from said source of infrared radiation is filtered to move any visible light from said beam.

References Cited in the file of this patent

UNITED STATES PATENTS

| | | |
|---|---|---|
| 1,309,359 | Kellner | July 8, 1919 |
| 1,458,165 | Cablentz | June 12, 1923 |
| 2,070,178 | Pottenger et al. | Feb. 9, 1937 |
| 2,136,682 | Gilbert | Nov. 15, 1938 |
| 2,237,193 | Mobsby | Apr. 1, 1941 |
| 2,774,961 | Orlando | Dec. 18, 1956 |
| 2,830,487 | Griffith | Apr. 15, 1958 |
| 2,838,678 | Beese | June 10, 1958 |
| 2,884,540 | Shockley | Apr. 28, 1959 |
| 2,930,278 | Hansen et al. | Mar. 29, 1960 |
| 2,968,994 | Surcliff | Jan. 24, 1961 |